E. A. HAILWOOD.
MINER'S SAFETY LAMP.
APPLICATION FILED SEPT. 25, 1906.

908,769.

Patented Jan. 5, 1909.

WITNESSES
W. P. Burk
John G. Percival

INVENTOR
Ernest Arthur Hailwood
BY Richards & Co.
ATTYS.

UNITED STATES PATENT OFFICE.

ERNEST ARTHUR HAILWOOD, OF MORLEY, ENGLAND.

MINER'S SAFETY-LAMP.

No. 908,769.  Specification of Letters Patent.  Patented Jan. 5, 1909.

Application filed September 25, 1906. Serial No. 336,212.

*To all whom it may concern:*

Be it known that I, ERNEST ARTHUR HAILWOOD, a subject of the King of Great Britain and Ireland, whose postal address is 3 Blenheim Terrace, Rooms Lane, Morley, in the county of York, England, have invented certain new and useful Improvements in Miners' Safety-Lamps, of which the following is a specification.

My invention relates to improvements in connection with locks for miners' safety lamps, and has particular reference to that class shown in British Patent, No. 23127, of 1895, the object of my invention being to provide means whereby a locking device and guard may be provided in the lamp vessel in such a manner as to prevent unauthorized persons from tampering with the guard, lock, or bolt.

Figure 1:
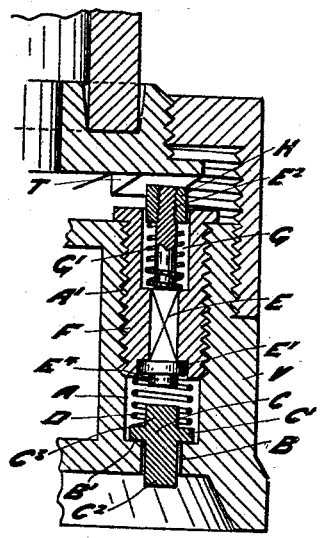
Figure 2:
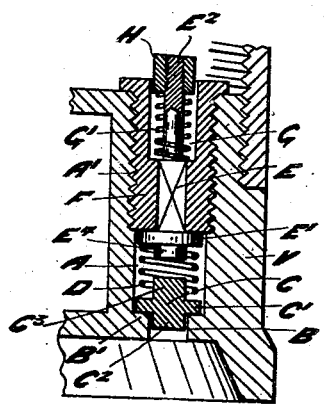
Figure 3:
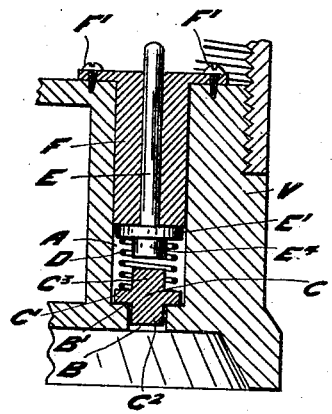
Figure 4:
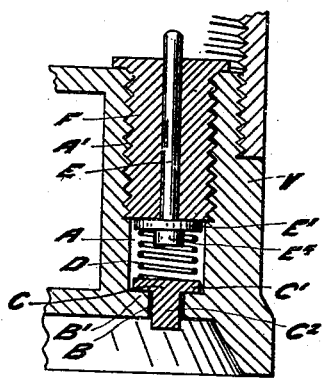

In describing my invention in detail, reference is made to the accompanying two sheets of drawings similar letters indicating similar parts, in which, Figure 1 represents a sectional elevation of a portion of a miner's safety lamp, fitted with one form of my improvement. Figs. 2, 3 and 4 are similar views of modifications.

In carrying out my invention, I drill in a convenient position in the lamp vessel V, and from the upper face of the same, a hole A having an outlet B at the base of the lamp vessel, smaller in diameter than the upper portion, thus forming a shoulder $B^1$. The upper portion of the hole A is, by preference, threaded at $A^1$, for the purpose hereinater described. Into the hole A I place an iron guard plate C having a flange $C^1$, substantially of the form as shown in Fig. 1. Above such flange and surrounding the said guard plate, I place a spiral spring D, the lower end of the same resting on the upper side of the flange $C^1$, which in turn rests on the shoulder $B^1$ before mentioned, the sliding guard plate C being arranged in such a manner that the lower portion of the same $C^2$ may pass through or slide in the orifice B. Directly above the guard plate C, I place a lock or bolt E, such lock bolt having a flange $E^1$ at its base, and its upper end $E^2$ threaded for the reception of a nut H. Into the opening A I place a bush such as F, which, when the hole A is threaded internally, will be threaded externally, though such bush may be retained in position by screw studs $F^1$, (Fig. 3) or other convenient manner, and not be threaded. The said bush has on its upper face an enlarged aperture G in which is placed a coiled spring $G^1$ and the nut H finally placed in position over the same. It must be understood that the springs $G^1$ and D may be of equal strength, or one stronger than the other as may be desired.

It will be obvious that the utilization of a solid ledge of metal $B^1$ at the lower end of the hole A and the insertion of the guard C, spring, and lock bolt E, from the upper face of the lamp vessel, will prevent unauthorized persons tampering with the lock. Further the aperture B, at the bottom, will not be so liable to become fitted up with dirt, or the like, when the lamp is placed on the floor of the mine, owing to the guard C occupying the same, which has been one of the defects hitherto experienced.

The lock bolt is withdrawn by means of a magnet in the ordinary manner and it will be noted that the guard plate must be pressed up by the magnet before the bolt may be withdrawn.

Fig. 3 shows another form, the spring D being inserted as in Fig. 1, but operating upon the base $E^1$ of the spring lock bolt E instead of upon the bush F.

Fig. 3 shows a form of construction in which the lock bolt E need not be provided with a screwed end $E^2$ and nut H, or spring $G^1$, nor need the hole A be threaded, the bush being attached by screws $F^1$. In this construction the spring D is placed substantially in the same position as shown in Fig. 4, but the lock bolt E is plain, provided with a flange $E^1$ having a slightly downward extending portion $E^4$, the guard having a slightly upward extending portion $C^3$ which serves as a guide for the spring D. In this case the magnet on being placed in contact with the sliding guard C will press the same upwards against the lock bolt E, and the lock bolt can then be withdrawn by attraction through the guard C.

Fig. 4 shows a similar form to that shown in Fig. 3, the upper portion of hole A being threaded to receive the threaded bush F.

It will be obvious to persons skilled in the particular art to which my invention refers that the same result could be obtained by forming an aperture of equal diameter through the lamp vessel, and inserting therein a tube provided with a ledge towards the base of the said tube, and in the interior thereof, such tube carrying the sliding guard, and the insertion of a bush into the top of the tube, such bush carrying the lock bolt substantially in the same manner as hereinbefore described and shown.

What I claim as my invention is:—

1. In combination, in miners' safety lamps adapted to be unlocked by a magnet, a lamp vessel, provided with a hole having its lower end of smaller diameter than the rest thereof, a sliding guard plate, having a flange, and one end projecting into the said lower end, a bush removably mounted in the hole above the guard plate, a locking bolt carried by said bush and having a flange and a spring located between the flanges of the guard plate and the bolt, and tending to keep said flanges separated.

2. In combination, in miners' safety lamps adapted to be unlocked by a magnet, a lamp vessel provided with a hole having its lower end of smaller diameter than the rest thereof, a sliding guard plate having a flange, and one end projecting into the said lower end, a removable bush, mounted in the hole, above the guard plate, a locking bolt mounted in the bush and a spring located between the flange on the guard plate and the bush and tending to keep the guard plate and bolt separated.

In witness whereof I have hereunto set my hand in the presence of two witnesses.

ERNEST ARTHUR HAILWOOD.

Witnesses:
CLIVE WAUGH,
JOSEPH F. KIRBY.